United States Patent Office 3,071,223
Patented Jan. 1, 1963

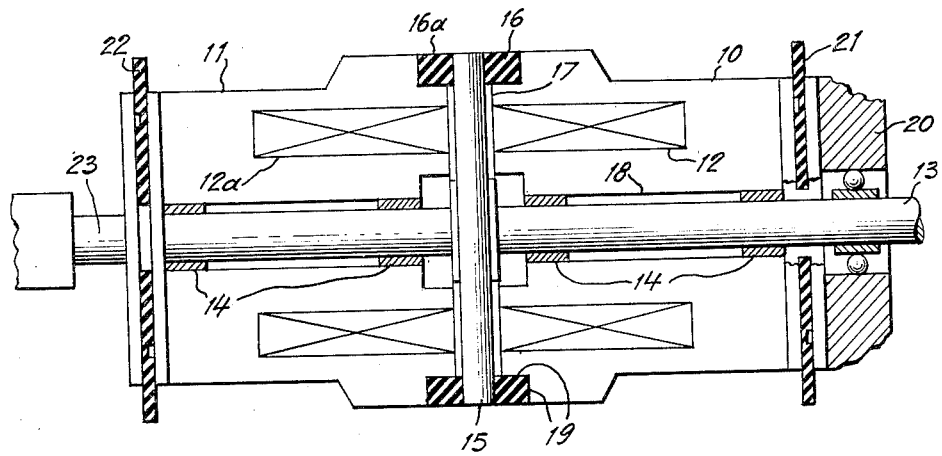

---

3,071,223
CLUTCH/BRAKE UNIT
Albert P. Lang, Philadelphia, and George R. Adams, Doylestown, Pa., assignors to Sperry Rand Corporation, New York, N.Y., a corporation of Delaware
Filed Sept. 10, 1959, Ser. No. 839,103
2 Claims. (Cl. 192—18)

The present invention relates to combined clutch and brake units such as are often used in the transmission of power between prime movers and small intricate mechanisms designed to operate at high speeds. Such mechanisms are often to be found associated with input-output equipment utilized in data processing systems. However, it will be evident to the expert that the clutch/brake unit shown and described herein will be applicable to many types of high speed automatic machinery and there is no intention to limit the invention to any one particular type of such machinery.

The invention is concerned with an improvement obtained through elimination of certain components from previously used clutch/brake units whereby a single element is made to perform the function of several elements in the prior art type of such mechanism. Thus, the entire assembly is simplified thereby leading to less expensive construction, fewer wearing portions and, accordingly, lowered maintenance costs.

It is, accordingly, an object of the invention to provide a new and improved electromagnetic clutch/brake unit.

A further objective of the invention is the provision of a new and improved combined electromagnetic clutch/brake unit where the clutch and brake facings are made to perform a plurality of functions.

Yet another object of the invention is the provision of a combined electromagnetic clutch/brake unit provided with clutch and brake facings which serve in lieu of thrust bearings.

Yet another object of the invention is to provide a combined electromagnetic clutch/brake unit provided with clutch and brake facings which serve the added function of defining an electromagnetic air gap.

Various further objects and advantages will become apparent to those skilled in the art as this description proceeds.

Briefly, the invention contemplates a clutch/brake unit which comprises a pair of housings containing an electromagnetic means, both such housings being individually and selectively capable of axial compliance and one housing being rotatable, while the other is fixed against such rotation. These housings are cylindrical in form and are mounted end to end along a common axis. An axial bore extending through both housings and provided with bearing means serves to journal a shaft on which is mounted a solid disk of magnetic material interposed between the two housings. The combined shaft and disk are rotatable and serve to transmit power into or out of the overall assembly. Interposed between the disk and each of the two housings is a ring of composition material which is arranged to be at all times in contact with the armature disk. By so arranging the facing rings to be in contact with the aforesaid disk, such rings may serve a plurality of purposes. Thus, when the selective actuation of the magnet in the electromagnetic means in one or the other housing occurs, the housing containing the energized magnet is attracted toward the disk, whereupon the facing ring serves as a frictional coupling. Since contact always exists between the disk and the facings, the facings serve as thrust bearings. Finally, said facing rings serve to establish an air gap between the electromagnetic means and the armature disk.

For a fuller understanding of the invention, attention is now directed to the single FIGURE, which shows a cross section of the combined clutch/brake unit of the invention.

Brake housing unit 10 and clutch housing unit 11, made from a metal casting or the like, have a cylindrical form and are each adapted to mount a solenoid coil 12 and 12a for selective actuation of the clutch and brake. These coils are fixedly mounted in annular slots which are formed in one end face of each of the housings as shown. Both such housing units are provided with an axial bore 18 running through the center thereof and both such units are placed end to end so that their axial bores are colinear. Mounted in their respective bores are journal bearings 14 and seated in such bearings is a rotatable shaft 13. Such shaft is rotatable but, by virture of a mounting secured to machine frame 20, is not intended to exhibit any axial movement. A solid armature disk 15 formed from magnetic iron or the like is fixedly mounted on the shaft 13 at a position interposed between the housing 10 and the housing 11. On the confronting end face of each housing a circumferential rabbet 19 is cut which serves to retain rings 16 and 16a of a composition facing material. Such rings of facing material could, for instance, be formed from one of the polyfluorides, nylon or an asbestos compound. The choice of material will be dependent upon the service intended for the mechanism. The facing rings 16 and 16a are interposed between the confronting end faces of each housing and the armature disk 15 and are at all times in contact with the aforesaid armature disk. The axial width of such facings 16 and 16a is greater than the axial depth of the rabbets 19 cut in the housing end faces and, therefore, an air gap 17 is provided between the armature 15 and the respective end faces of the two housing units.

In operation, in order to allow axial compliance of the respective housings 10 and 11, it is necessary to provide a compliant coupling means to secure the brake housing 10 to a machine frame as at 20 and to secure the clutch housing 11 to the output shaft of a prime mover 23. Such couplings have been indicated at 21 and 22 respectively and could for example take the form of Oldham couplings. Means will be provided for selectively exciting the respective solenoid coils 12 and 12a. It will be seen that by selective energization of one or the other of the solenoids the housing containing the energized solenoid will be drawn toward the armature disk 15 by the flux exerted through the air gap 17. If for example, the clutch portion of the combined unit is actuated by energization of solenoid 12a, it is clear that the housing 11 would be attracted toward the disk 15. The ring 16a now with greater bearing force exerted thereupon serves as a frictional coupling between the housing 11 and the armature disk 15 whereby the rotation of such housing is transmitted to the disk 15 and subsequently to the output shaft 13. The ring 16a, furthermore, through its constant contact with the armature disk 15 serves to maintain the air gap 17 substantially consistent, at least until such time as substantial wear has occurred. Because of such contact between facing ring and armature disk, the need for thrust bearings in the overall combination is eliminated. In effect all thrust forces are confined within the clutch/brake unit itself and the net thrust transmitted to output shaft 13 is at all times substantially zero. Such thrust bearings were formerly necessary to prevent axial displacement of the output shaft. When the brake portion of the combination is to be used, the solenoid 12 in the brake housing unit 10 may be energized. This effects once again a frictional coupling between the armature disk 15 and the brake housing unit 10. Since such brake housing is fixed against rotation by coupling 21 to the machine frame 20, the rotation of the shaft 13 will be rapidly halted.

It is clear that a new and improved clutch/brake unit has been provided with several important and useful features not heretofore known or used. Various modifications of such improvements may suggest themselves to those skilled in the art and it is therefore to be understood that the description contained herein is not meant to be limited to the precise embodiment shown but that the only limitations of the invention are such as are to be found in the appended claims.

We claim:

1. An electromagnetic clutch/brake unit comprising a non-rotatable cylindrical housing for braking purposes, a rotatable cylindrical housing for clutching purposes, both housings being provided with a central axial bore and being assembled so that said bores are arranged colinearly, a rotatable shaft extending through said bores, a disk of magnetic material fixed to said shaft and interposed between said rotatable and non-rotatable housings, electromagnetic means within each of said housings located adjacent said disk and capable of being separately energized and a ring attached to each of said housings and projecting therebeyond so as to contact said disk at all times, each of said rings serving to establish an effective air gap between said disk and the electromagnetic means, and serving as friction couplings between said disk and said housings and as thrust bearings for said shaft.

2. In a clutch/brake unit, a first non-rotatable housing containing electromagnetic means, a second rotatable housing containing electromagnetic means, said first and second housings each being of cylindrical form and each having a central axial bore and said housings being assembled so that said central axial bores are arranged colinearly, bearing means mounted in said bores, a rotatable shaft journalled in said bearing means whereby power may be transmitted to or from said clutch/brake unit, a solid disc of magnetic material fixedly mounted on said shaft and interposed between said first and second housings, means permitting selective axial compliance of each of said housings, circumferential rabbets cut on the inner end faces of said housings and a ring having an outside diameter equal to that of said disc mounted in each rabbet thereby to be interposed between said solid disc and each of said first and second housings, said rings being at all times in contact with said disc and of an axial thickness sufficient to establish an air gap between said disc and said electromagnetic means in each of said housings so that said rings serve as thrust bearings for said shaft, friction couplings between said disc and said housings, and air gap establishing means.

References Cited in the file of this patent

UNITED STATES PATENTS

| | | |
|---|---|---|
| 2,314,019 | Shaw | Mar. 16, 1943 |
| 2,595,190 | Edwards | Apr. 29, 1952 |
| 2,600,667 | Mason | June 17, 1952 |
| 2,642,169 | Hutchison | June 16, 1953 |
| 2,687,197 | Leifer | Aug. 24, 1954 |
| 2,728,878 | Sperr | Dec. 27, 1955 |
| 2,800,210 | Muller | July 23, 1957 |

FOREIGN PATENTS

| | | |
|---|---|---|
| 304,120 | Switzerland | Mar. 1, 1955 |
| 1,096,518 | France | June 21, 1955 |